Sept. 17, 1968  A. J. BUTTERWORTH  3,401,762
SIDEWAYS PARKING DEVICES FOR MOTOR VEHICLES AND THE LIKE
Filed Aug. 25, 1965  8 Sheets-Sheet 2
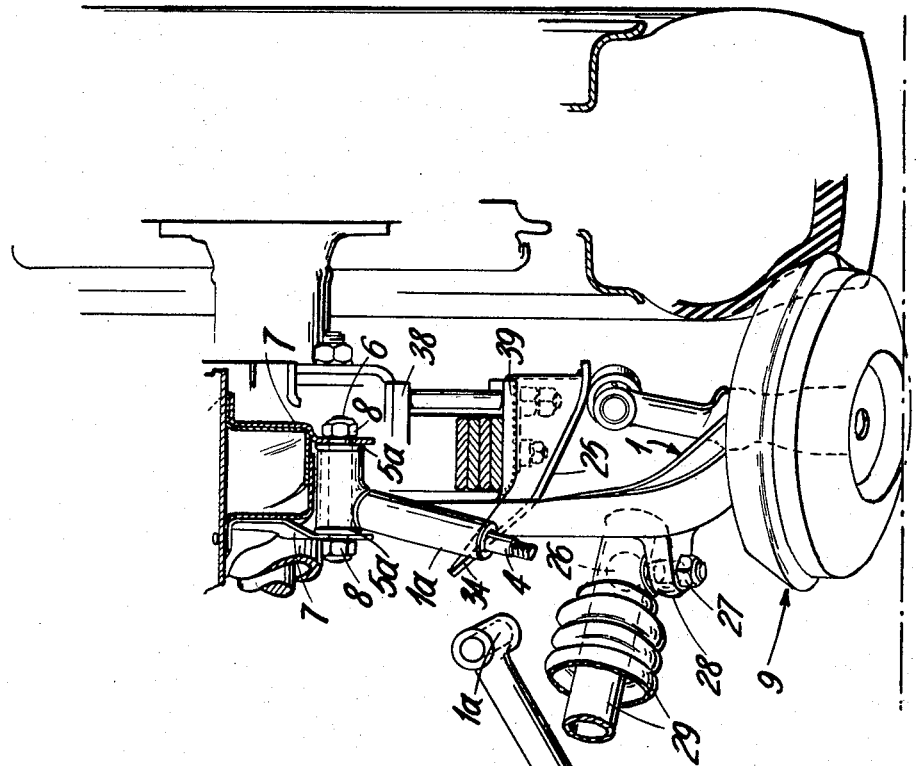
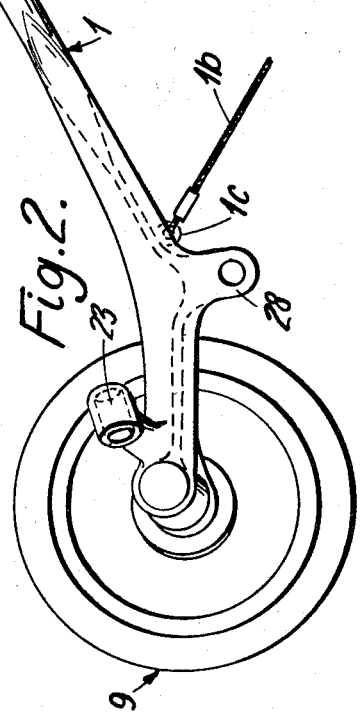

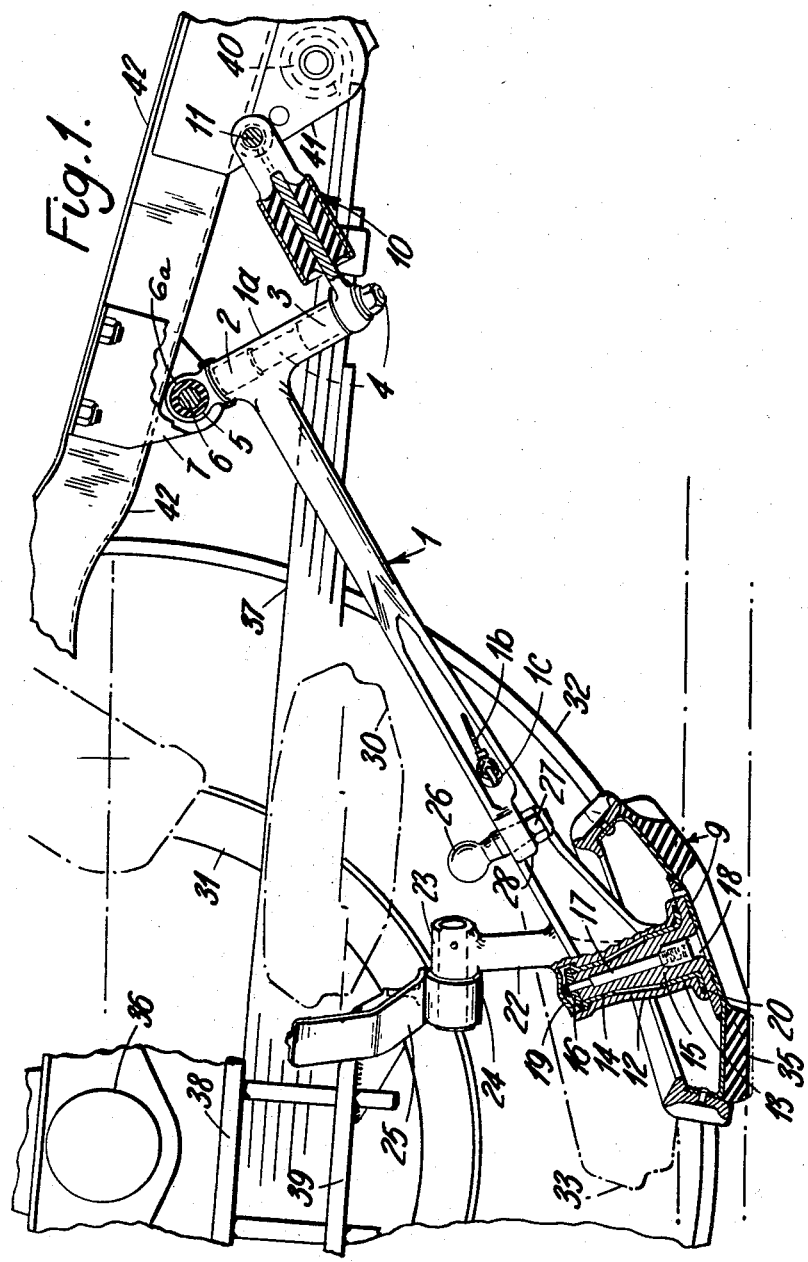

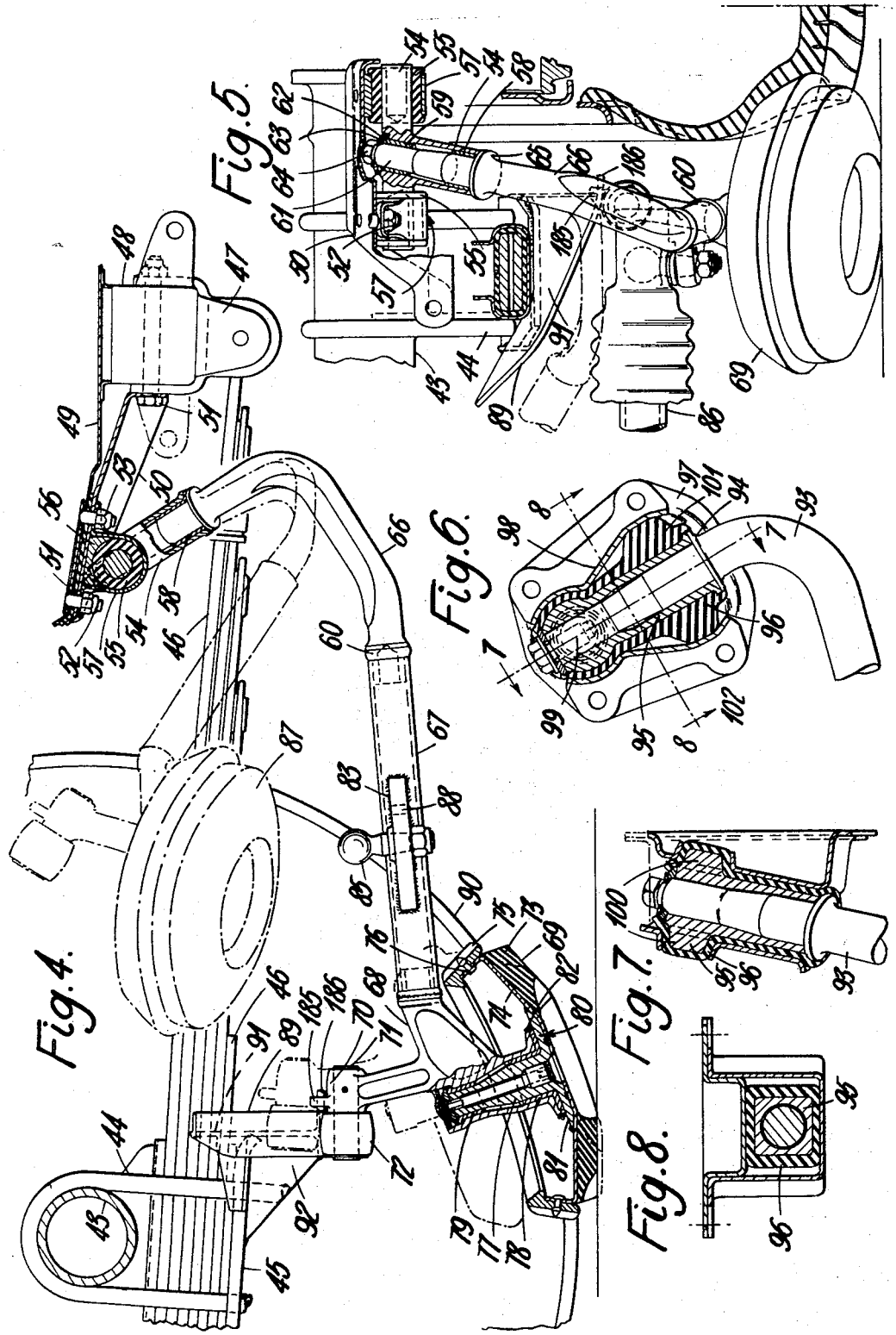

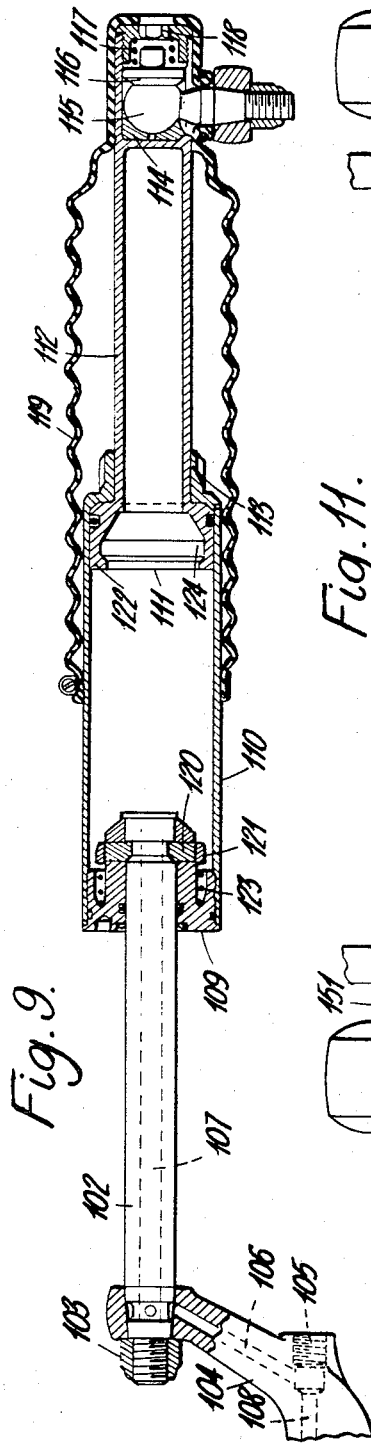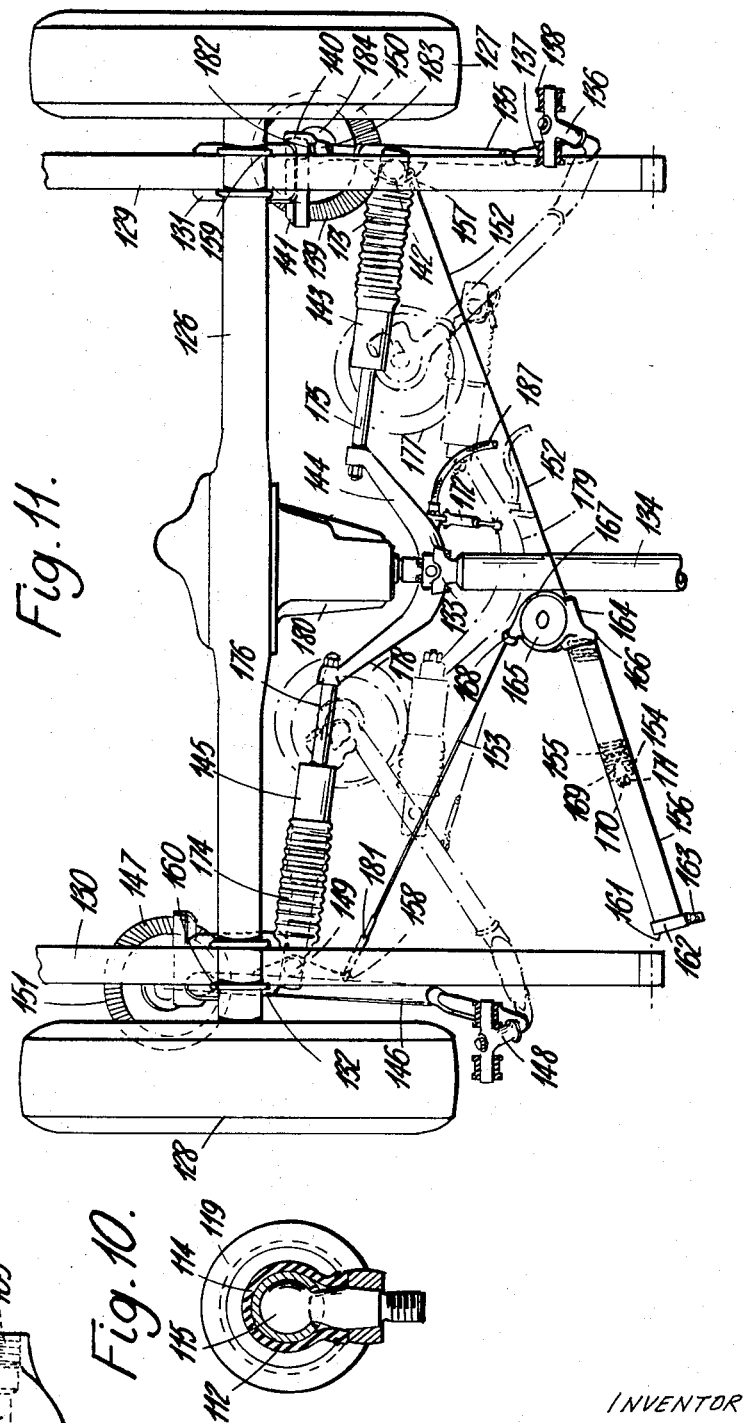

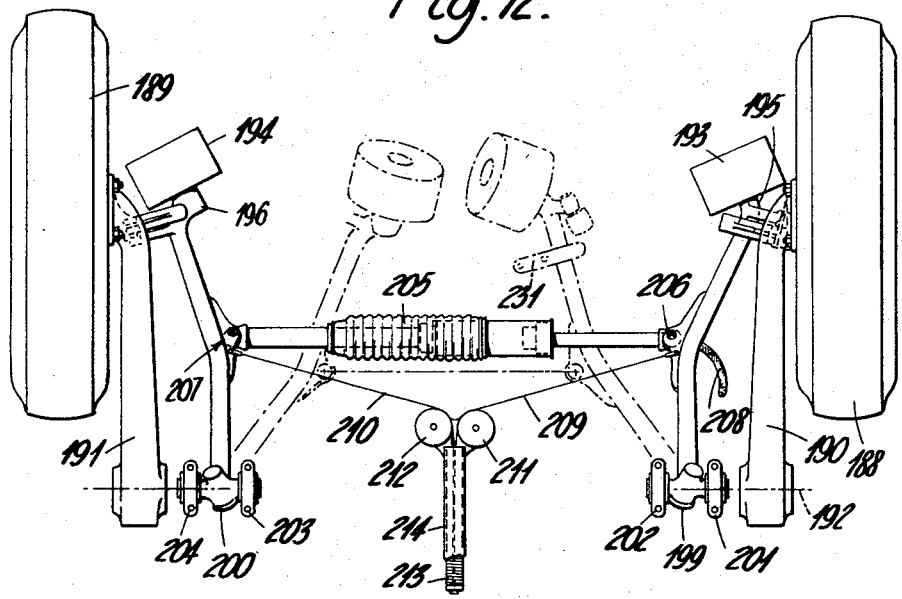

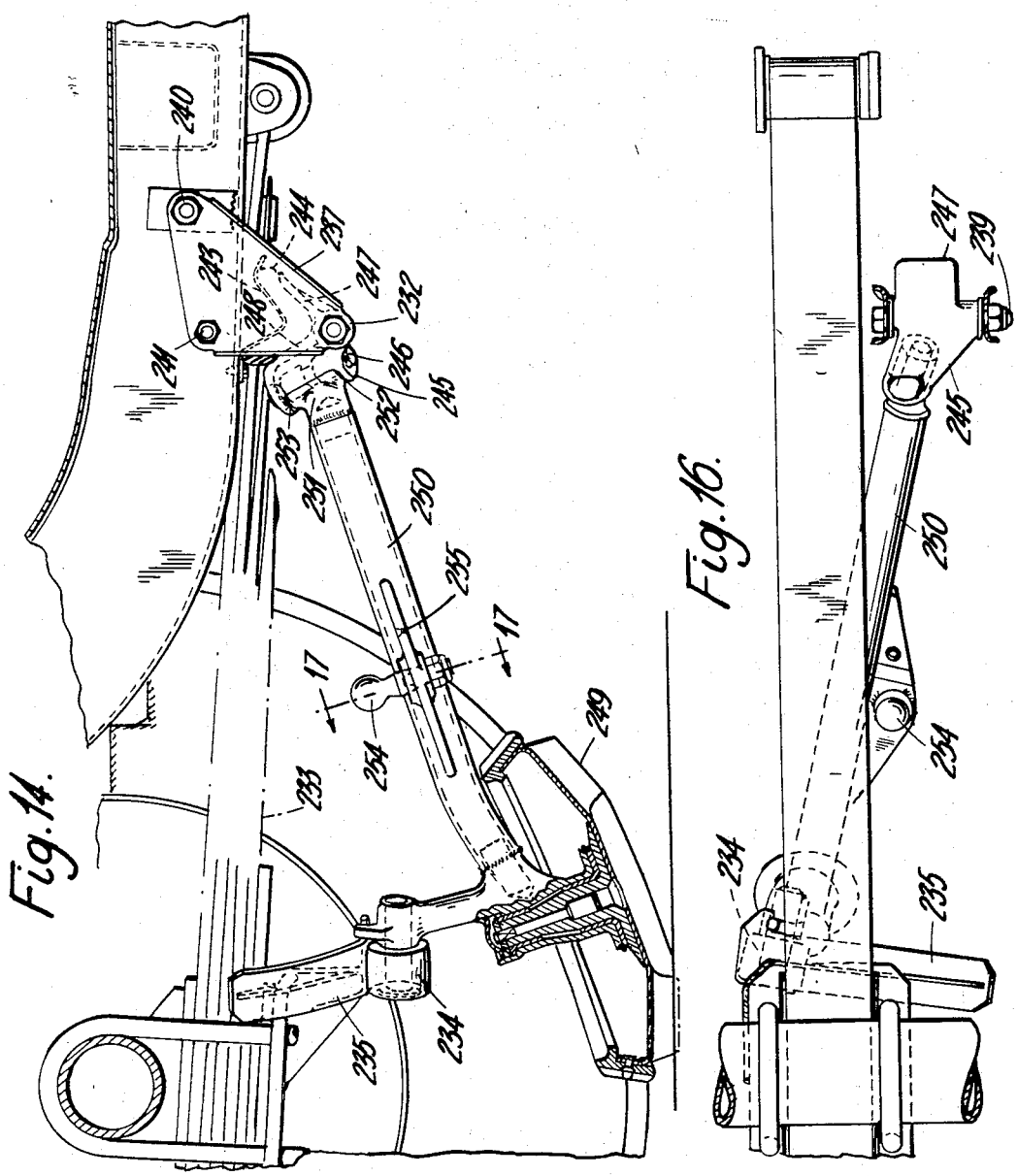

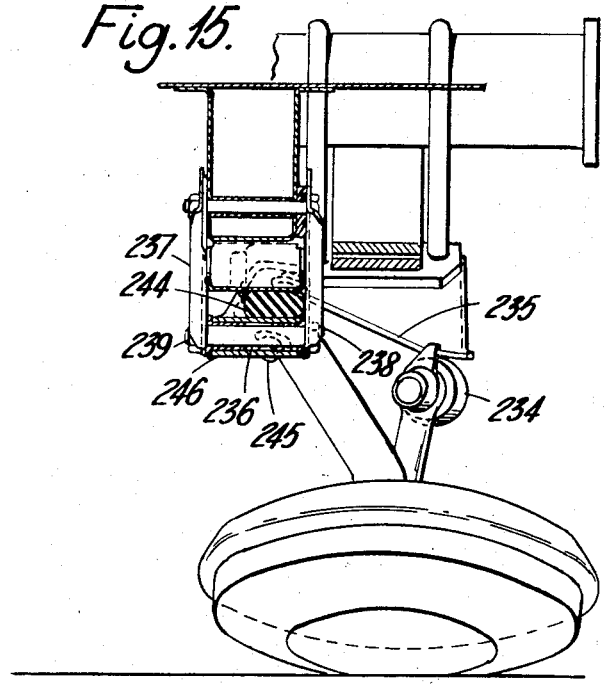
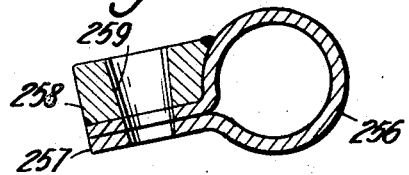

Sept. 17, 1968 A. J. BUTTERWORTH 3,401,762
SIDEWAYS PARKING DEVICES FOR MOTOR VEHICLES AND THE LIKE
Filed Aug. 25, 1965 8 Sheets-Sheet 8

INVENTOR
ARCHIBALD J. BUTTERWORTH
By Young + Thompson
ATTYS.

United States Patent Office 3,401,762
Patented Sept. 17, 1968

3,401,762
SIDEWAYS PARKING DEVICES FOR MOTOR
VEHICLES AND THE LIKE
Archibald James Butterworth, Frimley, England, assignor
to Sidler Limited, Frimley, England, a British company
Filed Aug. 25, 1965, Ser. No. 482,530
Claims priority, application Great Britain, Aug. 27, 1964,
35,114/64
16 Claims. (Cl. 180—1)

ABSTRACT OF THE DISCLOSURE

A device for sideways parking of a motor vehicle, comprising a pair of ground-engaging rollers mounted on swinging arms, and a hydraulic ram for swinging the arms to lower the ground-engaging rollers into positions close to a pair of the vehicle road wheels. Cam follower rollers on the swinging arms engage cam tracks on the unsprung part of the vehicle to lift the road wheels so that the adjacent end of the vehicle can be moved sideways on the ground-engaging rollers, the construction enabling the rollers, swinging arms and hydraulic ram to be carried on the sprung part of the vehicle to avoid any appreciable addition to the unsprung weight of the vehicle.

---

This invention relates to devices of the type wherein auxiliary wheels or rollers are caused to move from a retracted or inoperative position under a motor vehicle downwardly so that they bear the weight normally borne by the rear wheels, causing the rear wheels to be lifted slightly from the road and so that the driver may then move the rear of the vehicle to left or right at will through the agency of these rollers or auxiliary wheels by means of his normal driving controls. These auxiliary wheels or rollers are operated by some convenient power means such as hydraulic rams in conjunction with an engine driven oil pump and a control valve which can be moved to an operative or inoperative position by the driver.

Heretofore such parking apparatus has for the most part been mounted on the rear axle of the car, thus adding somewhat to the unsprung weight of the car suspension system. In the construction now disclosed the main components of the parking apparatus are attached to the sprung portion of the vehicle, and nothing is added to the unsprung weight except a small guide ramp mounted adjacent to each wheel hub.

According to this invention a parking apparatus for a motor vehicle of the kind in which ground-engaging rollers are mounted on opposite sides of a vehicle so as to be movable in an up and down direction, which movement is imparted to them by power mechanism in such a manner that, at the lower limit of movement, the rollers engage the ground and lift the vehicle wheels from the ground, a transmission for rotating the rollers when the car wheels are lifted from the ground, which rollers are so mounted that when rotated they move the vehicle sideways, and is characterised in that the assemblage or greater part of the assemblage comprising said rollers, their mountings, the power mechanism and said transmission is carried on a sprung part or parts of the vehicle and in that parts moving with the ground-engaging rollers towards their downward limit of movement are adapted to impart an upward thrust to the unsprung part of the vehicle whereby the wheels are moved clear of the ground and the rollers come into engagement with the ground, whereupon they are rotated by said transmission.

The ground-engaging rollers may be mounted on arms provided with pivotal connections which secure them to sprung parts of the vehicle so that they may swing in an up and down direction and wherein parts on said arms towards the lower limit of their swinging movement cooperate with means on the unsprung part of the vehicle so as to impart said upward thrust.

Each said pivotal connection securing an arm to a sprung part of the vehicle may be so constructed that there may be pivotal movement of one part of the connection relatively to the sprung part of the vehicle about a substantially horizontal axis approximately at right angles to the fore and after axis of the vehicle, and so that there may be pivotal movement between said one part of the connection and the arm carrying the ground-engaging roller about an axis oblique to the first said axis, this second axis being arranged normal to the plane swept by the ground engaging roller as it moves from its inoperative or retracted position downwards and outwards to its operative position in contact with the road and adjacent to the vehicle wheel and wherein the roller is so mounted on the arm that when it reaches its operating position it is supported in the correct attitude to impart sideways movement to the vehicle, when it is rotated by the said transmission.

Means may be provided for effecting resilient restraint to the pivotal movement of the parts of the first said connection about the first said axis.

Cam and cam follower means may be associated with each said arm and unsprung parts of the vehicle for imparting a lift to the latter.

For example cam tracks may be mounted on said unsprung part of the vehicle which are engaged by cam followers on the swinging arms.

Each said cam track may be fixed to a mounting plate for a vehicle wheel spring.

The cam follower may comprise a roller the peripheral face of which in section containing the axis of the roller is convexly curved.

Up and down movement may be imparted to said ground-engaging rollers by a substantially floating fluid actuated ram mechanism.

Parts of the floating fluid actuated ram mechanism may be articulately connected to said arms.

The articular connections may be universal joints.

The fluid actuated ram mechanism may be single acting and may be arranged to impart downward movement to the ground-engaging rollers against the action of spring means which is adapted to impart return upward movement to the rollers.

Two rams may be provided connected at one end to a thrust sustaining member and are articulately connected at their other ends to the two arms which carry the ground-engaging rollers.

The thrust sustaining member may be shaped so as to straddle the propeller shaft or differential gear box of the engine.

The thrust sustaining member may be slung from a sprung part of the vehicle by resilient means so as to prevent rotation of that member about the axis of the rams.

As indicated above the parking roller is attached to one end of an arm which is pivotally mounted on the main or sprung portion of the car at its other end. The axis of this pivotal mounting is so arranged that the roller, when not otherwise constrained, will swing in a circular arc from a convenient retracted position to the point where it first touches the ground some distance inward from the adjacent rear wheel. As a convenient retracted position for the roller must be clear of the axle and suspension and transmission components and of the upward and downward sweep of such components relative to the sprung portion of the car due to irregularities of the road, and as this retracted position must allow a satisfactory ground clearance between the roller and the road, the retracted position will normally be displaced from the operative position both in a fore and aft direction, and inwardly from the road wheel towards the centre of the car, and upwardly. To secure this diagonal and fore and aft displacement of the roller the axis of the pivotal mounting above must be inclined outwardly and/or rearwardly as it extends upwardly in the case of a pivot which lies to the front of a rear wheel, or outwardly and/or forwardly in the case of a pivot situated to the rear of the rear wheel.

The parking roller is moved from its normal retracted position to its operative position by means of an hydraulic ram, one end of which is anchored near the centre of the car. The other end may be ball-jointed to a point on the pivoted member near the end of which the parking roller is mounted.

Alternatively, it may be attached to this member by a pin-joint whose axis is substantially parallel to the pivot axis above for the purpose of providing additional torsional stiffness in the roller mounting in cases where the pivoted member is not itself sufficiently stiff in torsion. Where such a pin-joint is used however, a restriction is placed on the location of the inner ram anchorage, which must then lie substantially in the same plane as that swept by the outer ram anchorage.

In the description below it will be assumed that the ram is ball-jointed at both ends.

A difficulty encountered in mounting any type of parking roller on the sprung portion of a car, is that the upward reaction of the hydraulic ram or other power means lifts the sprung portion on its springs, and leaves the road wheels in contact with the road until the car has been lifted so high that the springs are fully relaxed and ultimately the road wheels are only raised from the ground when hanging from the road springs or rebound limiting straps, if fitted.

As this may involve lifting the rear of the car nearly a foot in the air it is obviously unsatisfactory as a parking means. Apart from the discomfort to passengers, the car is caused to be in a very unstable condition for sustaining the rolling moment set up by the sideways acceleration of starting and stopping the parking movement.

In the present invention this difficulty is overcome by causing an upward extension of the parking roller mounting to engage with an inclined member or ramp attached to the unsprung portion of the rear wheel mounting. The upward extension of the parking roller mounting may be fitted with a small cylindrical roller whose pivot axis is arranged to be horizontal and in a substantially fore and aft plane when the parking roller is in its operating position. This cylindrical roller, which will be referred to as the jack roller, engages the cam above shortly after the parking roller has made contact with the road, and it then performs the operation of jacking the rear wheel slightly clear of the road as the parking roller approaches the rear tyre, and is forced into frictional contact therewith by continued action of the hydraulic ram.

In the mechanism so far described, the member connecting the parking roller to the sprung portion of the car has simply been described as pivoted thereto, and if this pivot and the connecting member were both assumed to be rigid, the car would now be ready to be driven sideways by operation of the normal forward and reverse gears and clutch, but would have no springing other than the resilience of the elastic tread of the parking rollers. It will be seen that the normal road springs would have been put out of action by the jacking operation above.

Although the low speed operation of driving a car sideways does not require the very supple low frequency type of damped springing which is essential for high speed travel, some springing is required, and in the present invention this is provided by arranging for a certain degree of flexibility in the pivotal attachment of the above member to the sprung portion of the car.

This flexibility may be provided by arranging for the member connecting the pivot to the parking roller assembly to have sufficient resilience as a cantilever deflected in the vertical plane, so that it can itself act as a spring without excessive stress, or by arranging that the pivot mounting is capable of resilient rotation in a vertical fore and aft plane, or by both these measures together. As the member must support the parking roller against fore and aft thrust and against rotation in any direction out of its correct operating attitude, the spring resilience as above must be provided in a way that will not prejudice the correct support and location of the parking roller mounting.

The pivotal attachment of the connecting member to the car frame may consist of two resilient bushes, the lower of which allows only very slight deflection in a fore and aft sense, whereas the upper is so arranged that a vertical load applied to the parking roller assembly allows it to be displaced against increasing spring resistance. This spring resistance may be provided by conventional steel springs, or by the deflection of a suitable rubber mounting, as shown in the drawings. This arrangement is suitable for suspensions wherein the rear wheels rise and fall vertically, but it may be reversed where normal leaf springs are used so that the vertical axis about which the arm deflects is located high up near the virtual axis of the springing. This is desirable to reduce horizontal sliding between the jacking components as the car rises and falls by reason of this spring action while traversing the road.

It will be appreciated that the normal road springs and shock-absorbers fitted to the car will be deflected by rise and fall of the car body relative to the road and to the parking roller in contact with it, and that the road spring and damper effort will be an additional factor in the total resistance to rise, fall, or roll of the car body with relation to the road during the sideways movement.

In analysing the suspension of a car fitted with a parking device of the type described above, a further factor is contributed by the reaction on the car body of the thrust of the two hydraulic rams. These will normally be attached near the centre of the car and when fully extended they will usually slope somewhat upwards towards their inner ends. As each might exert a thrust of say 1500 lbs. along its axis, there will be a vertical upward component which will vary with the angle of the rams, but which in a typical case might amount to some 200 lbs., tending to lift the car on its springs.

Such lifting relative to the lower ram anchorage points will be undesirable as introducing lost ram motion, and it may be neutralised in the present invention by arranging that the pivoted members carry the rollers to the ground at the point described above with the spring resilience of the connecting member and/or its pivot at zero deflection.

When further extension of the rams forces the jack-roller to move outward and downward along the jack-ramp, the downward deflection of the parking roller assembly relative to the car body may be arranged to apply a spring stress tending to cause the car body to follow the parking roller assembly in its downward movement, and this downward effort applied to the body may be arranged to be of approximately equal value to the upward component of ram force described above, so that no appreciable rise of the car body takes place relative to its road wheels. The action of the jack-rollers on the jack-ramps associated with each rear wheel hub will, of course, cause each road wheel to rise from the road a sufficient distance to relax the tyre deflection, and give the tyre a small clearance, say ½″ to ⅝″ from the road, and it is acceptable for the car body to rise a similar amount, as this signals to the driver that the parking rollers have reached their operating position.

Alternatively, by increasing the spring force required to deflect the roller assembly downwards relative to the car body, it could be arranged that the car body remained at its normal height and the road wheels rose relative both to it and to the road. The springs or other flexible elements associated with the pivotal mounting of the arms supporting the parking roller assemblies should be so proportioned as to give a total spring rate and resistance to roll of the rear portion of the car when supported on the parking rollers, considerably higher than the spring rate and roll resistance of the normal rear suspension when the car is supported on its tyres.

With a high spring rate incorporated in the pivots above, the effect on the total suspension characteristics when the parking rollers are in operation, will be to permit a limited amount of bump movement at comparatively low total rate as the pivot resilience relaxes from its downward extension relative to the car body, followed by a rapid rise in rate when this resilience turns to a positive value and becomes additive to the road spring force instead of subtractive.

It is already known to provide control means which are retained in their operative or "on" position solely by hydraulic pressure, so as to give a self-cancelling effect, i.e., so that if the driver forgets to push the control knob to the off position after using the device to park, for example, as soon as he switches the engine off, and pressure decays in the system through leakage, the control valve automatically returns to the off position, and the parking units are pulled back to their retracted position clear of the road by spring means. In previous specifications a separate spring has been shown operating the parking unit associated with each rear wheel, but in the present invention it is preferred that a single spring should be caused to retract each unit simultaneously.

This single retraction spring assembly is considerably lighter and cheaper than the springs formerly used, but its main functional advantage is that it so arranged as to impose synchronism on the two hydraulic rams which provide the power means for bringing the parking rollers into their operating position. This synchronisation applied both to the extension and retraction parts of the ram cycle.

Although any type of hydraulic ram may be used with the invention, considerable advantage attaches to the use of the special two-stage ram where a small diameter inner piston is caused to extend first. Its operating area is such that it is able to overcome the restraint of the retraction spring and carry the parking roller to a point near the road, a mechanical interlock mechanism then locks the upper piston in its extended position and frees the larger working piston which carries out the further task of lifting the rear wheel from the road and pressing the parking roller into frictional drive contact with the tyre.

In service use of these special rams, and to a lesser extent with conventional two-stage rams, it was found that the time to extend and retract the two parking units was unnecessarily extended because in practice one ram usually reached the change-over point where the interlock operated before the other. A situation then arose where the unit whose working piston was in operation had a large piston area opposed only by the retraction spring force, so that with a fixed flow of oil from the pump, oil pressure in the system immediately dropped from the figure of several hundred pounds per square inch required by the small pistons to overcome retraction spring force, to the very low value called forth by the working piston performing the same task. The effect of this occurrence was frequently to cause the other ram still with its small piston in operation, to snap partly or wholly back to its retracted position as the lower pressure was insufficient to sustain the small piston in extension. The second ram would not recommence extension until the working piston of the first ram has brought its parking roller into contact with the road when pressure again rose.

The main advantages of this special type of ram are the large reduction in fluid displacement for a given length of extension and a given working force, thus permitting a small capacity oil pump of low torque requirement, and the very short cyclic time to bring the parking roller into operation as compared with a conventional two-stage ram. Obviously if the rams function out of phase with one another as described above, a great deal of this advantage in speed of operation is lost.

In the retraction spring arrangement now proposed, any type of spring may be caused to rotate a drum to the outside of which are secured two cables or tapes which are wound on the drum as the spring relaxes, and drawn off it as the rams extend. Normally both parking units will have the same travel on extension, and the cables are adjusted so that both are tight when the equipment is in the fully retracted position, some initial tension being present in the retraction spring which may conveniently be of the clock-spring type located inside the drum.

On oil pressure being applied to the system, both rams commence to extend, and it will be impossible for either ram to get appreciably ahead of the other in its cycle since to do so it would draw off more cable from the drum, thus relaxing the cable connected to the other assembly and causing that ram immediately to extend rapidly to catch up. However there may be a degree of spring built into the system to ensure that both assemblies are held firmly in the retracted position, to eliminate rattles, or to allow for abnormal cases where one assembly may have more travel on extension than the other.

In any of these cases one ram might pass its interlock change-over point before the other, but this would not have the undesirable results explained above, as although the pressure in the system would drop when the first working piston came into operation there would be no tendency for the opposite ram to retract as continuing movement of the working piston would relax the cable controlling the ram which was still in its inner piston stage.

Similarly on retraction, with independent retraction springs, it sometimes happened that a road obstruction or irregularity delayed the freeing of one parking roller from the road, and this delay tended to be prolonged because of the back pressure set up in the system by the opposite retraction spring swinging freely up to its retracted position so that the opposite roller did not commence movement until the free unit was fully retracted. With the single spring now described and interdependent cables, if one assembly is retracting normally and the other is for any reason delayed or obstructed, the whole spring effort will be transferred to the lagging unit, so ensuring that the delay is overcome as quickly as possible.

As an alternative to cables wound side by side onto a drum as described later with reference to the drawings, two tapes, or a single tape wound back on itself at the point of attachment, may be superimposed and wound one over the other on the drum. This may be convenient in some cases particularly where there is a slight difference in the extension required on each side.

As it may not be desirable on grounds of cost or restricted space, to use a drum and clock-type spring to provide the central retraction spring force described above the same result may be achieved by using a spring which acts linearly such as an extension or compression coil spring and to anchor the cables (conveniently one cable bent back on itself) to the moving end of such spring, or to a part associated with it. The extension or compression of this spring may be along any convenient line and the initial movement of the cables will of course be parallel with the spring axis. Each cable may then be turned by means of pulleys or gudes until it acts along the line required to retract each parking unit. For example, a compression spring may be housed in a tube or borne on a rod, and its stationary end may rest against an abutment secured to the car frame. The free end of the spring may extend forwards along the fore and aft axis of the car and may be restrained and located by a collar sliding on the central rod or in the tube mentioned above. In the case of a central rod being used the spring assembly may be protected from the weather by a rubber bellow or any convenient type of cover. The cable may be passed through diametrically opposite holes in the collar and may then be bent aside forming a loop passing around a locking screw and washer. The cables may pass rearwardly inside the spring alongside the central rod and thence be guided around two pulleys whose axes lie approximately vertical, but converging towards one another as they approach the ground. The cables may then reach from these pulleys to suitable shackles on the arms carrying the parking rollers.

On initial assembly the locking screw may be slackened and the cable adjusted so that in the fully retracted position both arms are held against suitable sound deadening abutments, such as rubber faced crutches. The locking screw is then tightened, and in operation it will be seen that the two parking units will be constrained to extend simultaneously, as equal amounts of cable will be paid out for a given deflection of the spring. If for any reason a different angular sweep is required by the arm on each side, the position at which the cable is shackled to each arm may be adjusted towards or away from the arm pivot so that substantially the same length of cable is pulled off during the movement of each arm from the fully retracted position to the operative position.

If the spring can conveniently be located along the average line of action of one of the cables, the assembly can be simplified in that only one guide or pulley is required and the cable serving the opposite parking unit is reversed in direction approximately 180° by this single pulley.

In a case where it is convenient to mount one of the parking units in front of the rear axle, and the other to the rear of the rear axle the lines of action of the cables may be separated from one another by a considerable distance, perhaps twelve to eighteen inches. In such a case the arrangement referred to above where the coil retraction spring lies along the fore and aft axis of the car in a more or less central position may be modified so that one pulley or guide turning the cable say 90° is located close to the fixed end of the spring, say the cable serving the unit located in front of the axle, whereas the second cable serving the unit to the rear of the axle may pass straight back along the fore and aft axis of the car until it reaches a point opposite the rearward parking unit when it may be turned at 90° in the other direction and directed towards the shackle on the arm of the rearward parking unit. It may be desirable to protect the cables from dirt and weather by covering them for some part of their length in protective outer cables. These outer cables may simply be protective and without anchorage at their ends remote from the spring, or they may be of the Bowden cable type or of any other known type where the outer cable is in compression and is anchored to the frame at its remote end. Adjustments, as by bottle screws or the like may be incorporated in any part of the system to ensure the correct length and travel of each cable.

In the forms of the invention described so far two hydraulic rams have been specified having their inboard ends anchored to the sprung portion of the frame. On large cars, particularly those having conventional axles whose propeller shafts rise and fall with the action of the springs, and where one or both of the parking units are conveniently mounted in front of the rear axle, it will usually be desirable to use two rams. In many cases however, particularly where small cars with front-wheel drive are concerned, or where a rear-wheel drive car of moderate size has a propeller shaft whose location is fixed and reasonably high above the ground, or where both parking units can conveniently be mounted behind the axle, a single ram may be employed. Each end of the ram may be attached to opposite arms of the two parking units so that it lies horizontally between them. The ram will require to have a sufficient extended length to provide the total movement required by both units, but in the case of small cars this may be little if any longer than the travel required with two rams on larger cars, since the ram ball-joints may be located nearer to the pivoted ends of the arms as a lesser force is required to place them in their operating position.

In the case of cars which have a propeller shaft rising and falling with spring movement, i.e., cars with normal rigid rear axles, two rams of the type described above may be arranged horizontally with their outer ends ball-jointed to the arms on each side, and their inner ends, which will normally be the ends of the small diameter inner pistons, may be connected by a C-piece to which each ram is rigidly secured, for example, by means of a taper and nut. The ram assembly will thus consist of a rigid strut with a bowed central portion to enable it to clear the propeller shaft, both in the operative and retracted positions.

It will be described later with reference to the drawings that this C-piece will be free to rotate around the axis of the rams, and it may be supported by a light arm hanging from the car body, so that it takes up an attitude which enable it to clear the sweep of the propeller shaft as it rises and falls, and at the same time, to accept the thrust of the two rams as they push outwards on the arms of the parking units.

The arm supporting the C-piece may be extensible beyond its normal length by spring means particularly in the case of cars which have no definite rebound stops. The purpose of this extensibility is to permit the axle nose or the propeller shaft to push the bow of the C-piece down beyond its normal attitude, which will lie between the horizontal and the vertical, when the car body is raised by means of a jack, as under these conditions the degree of relaxation of the springs and drop of the axle and propeller shaft relative to the car body may greatly exceed that which occurs as a result of spring movement when the car is in motion.

The C-piece which may be a forging, may be drilled or may have pipes attached to it to permit the feeding of oil into each hollow inner piston, and may have a screwed connection to which a flexible hose is attached, the remote end of which is attached to the chassis, and connected to a pipe leading to the pump and control valve.

In the case where the two parking units have their pivots mounted in front of the rear axle, the nearside parking roller will be located somewhat ahead of the axle centre line, and the offside one somewhat to its rear, in order to provide the correct geometry of the drive from the tyres to the flank of the roller as illustrated in the drawings accompanying this specification. For this reason, it will be convenient to mount the pivots of the offside arm somewhat further to the rear and further outboard from the centre of the car than that of the near side arm. The pivot is so located in order that the arm may not be too long, and that it may be conveniently arranged so that when the offside roller is in the retracted position, it will attain a location in front of the axle and clear of suspension components, etc. and at a sufficient height to give adequate clearance from the road. As it is desirable that the force with which each parking roller is pressed against the tyres be the same, it follows that the ball-joints at each end of the ram assemblies must be so located that the ratios between the lever arm at which the ram acts about the arm pivot, and the distance between the roller and the pivot on each arm shall be the same. For this reason, the ram assembly when viewed from above will usually be inclined slightly to the rear as it extends across the car to the offside.

Similarly, to ensure the correct functioning of the retraction spring assembly, the points at which the retraction spring cables are anchored to the arms may be suitably adjusted.

In the constructions where either a single ram or two rams connected by a structural member are arranged substantially horizontally so that they push outwards on each arm, it will be seen that there is no definite sideways location of the parking units, except the restriction of the retraction spring cables, and ultimately the resistance to deflection of the tyres.

A number of factors such as a soft tyre on one side or a steep camber or excessive roughness or an obstruction on the road surface, might cause the whole assembly to be biased to one side relative to the road wheels, and this might result in a weak drive and slippage on one side. It will be desirable, therefore, to provide a definite stop to the outward movement of each arm and parking roller assembly, so as to ensure that there is sufficient engagement on the opposite side before all the ram travel is exhausted. This may conveniently be provided by forming an upward extension above the jack-roller pivot housing, so formed as to act as a striker and to come into contact with a projection formed on the lower extremity of the jack-ramp, thus limiting the travel of the parking unit. This projection should extend in the direction of the arm pivot a sufficient distance, so that it will always engage with the striker under varying conditions of load, which may produce small changes in fore and aft location of the rear part of the arm relative to the wheel hub.

The following is a description of a number of embodiments of the invention as applied to different cars, reference being made to the accompanying drawings in which:

FIGURE 1 shows an elevation of the rear wheel of one kind of car and the associated suspension components viewed from a point near the road, and in front of the opposite rear wheel, and showing part of the sprung portion of the car frame. The forward part of the car extends to the right of FIGURE 1 and the rearward part to the left, FIGURE 2 shows a view of the arm and the parking roller only looking from above FIGURE 1 and also showing part of the retraction spring cable, FIGURE 3 is a view of the assembly shown in FIGURE 1 but as viewed from the front, FIGURES 4 and 5 are similar views to FIGURES 1 and 3 and showing an alternative assemblage fitted to another type of car, FIGURE 6 is a section through an alternative form of bush in the pivotal connection for the arm carrying the ground-engaging roller in a plane at right angles to the plane of the section shown in FIGURE 1, FIGURE 7 is a section on the line 7—7 of FIGURE 6, FIGURE 8 is a section on the line 8—8 of FIGURE 6, FIGURE 9 is a section through an operating ram, FIGURE 10 is an end view of the arrangement shown in FIGURE 9 and showing a section through the ball joint to the right of FIGURE 9, FIGURE 11 is a plan view of the parking unit as shown in FIGURES 4 and 5, FIGURE 12 is a plan view of an assemblage suitable for use with a front wheel drive vehicle, FIGURE 13 is a side elevation of the cam and cam follower mechanism, FIGURES 14, 15 and 16 are respectively a side elevation, forward elevation and plan views showing a further alternative method of attaching the arm carrying the ground-engaging roller to the sprung portion of a vehicle, FIGURE 17 is a section on the line 17—17 of FIGURE 14, FIGURE 18 is a rear view of a vehicle fitted with an alternative form of mounting for the mechanism showing the ground-engaging rollers in an operative position, and FIGURE 19 is a similar view to FIGURE 18 showing the ground engaging rollers in a retracted position.

In FIGURE 1, the arm 1, which in this case is a forging, has formed on its upper and forward end a tubular portion 1a approximately at right angles to the main part of the arm, and pressed into this portion are bearings 2 and 3. These bearings are supported on a pivot-pin 4 which is itself formed integrally with the outer housing of a flexible bush 5. This flexible bush may be of the bonded type in which it is bonded between a journal 6 and a housing 6a or may be formed of two separate bushes having flanges 5a as shown in FIGURE 3. These flanges abut against shoulders on the journal 6, which is secured between pressings 7 by nuts 8. The pressings 7 are fixed to a cross member 42 rigidly secured to a sprung part of the chassis frame.

As this parking unit assembly is of the type referred to above, wherein two separate rams are used, each with its upper end anchored by means of a spherical bearing to the car chassis, the lifting effect resulting from the vertical component of the ram thrust will be present, and so a substantial spring force must be associated with vertical deflection of the rear end of arm 1 where the parking roller 9 is counted. For this reason, the lower end of pivot-pin 4 is attached to one end of rubber bush assembly 10 which is arranged for linear deflection. The forward end of rubber bush assembly 10 is secured to the part 42 of the car chassis by bolt 11.

Fixed to the rearward end of arm 1, is a housing 12 which carries flanged bearings 13 and 14. These support the spindle 15 of the parking roller 9 which is retained therein by a plate 16, bolt 17, and socket nut 18. To seal the upper part of this bearing assembly, a dished disc 19 is pressed into an appropriate counter-bore at the top of housing 12. A space is provided between outside diameter of the flange of bush 13, and the inner wall of bottom recess in housing 12, to accept an oil sealing ring 20 and to prevent the accumulation of mud or water inside the shell of parking roller 9 three drain holes as 21 are provided.

Immediately above housing 12, on arm 1 an extension 22 is formed, carrying a substantially horizontal bore in which is fixed a pin 23 carrying a jack-roller 24. This roller may be slightly barrel-shaped on its outer surface and may be either of metal with any convenient type of bush to act as a bearing, or may be made of an engineering plastic such as nylon of a self-lubricating type.

In FIGURE 1 the mechanism is shown in its operating position, in which the jack-roller 24 by the downward swinging of the arm 1 has been brought into engagement with a jack-ramp 25, which is attached to the lower spring attachment plate 38. The downward swinging of the arm 1 brings the roller into engagement both with the ground and with the rear tyre 32 thus lifting the wheel clear of the ground and driving of the wheel causes the roller to be rotated which imparts sideways movement to the vehicle as more fully described with reference to FIGURES 4 and 5.

At an intermediate point between the axis of parking roller 9 and the pivoted end of arm 1, a ball 26 is secured by means of a taper and nut 27 to a lug 28 on the arm 1. A moving part of a ram 29 is secured to this ball as shown in FIGURE 3. The other end of each ram is slung from an unsprung part of the chassis. A retraction spring cable 1b is attached to the arm 1 at 1c in FIGURE 1. The outline 30 shown in chain line in FIGURE 1 indicates the approximate position of parking roller 9 when in the retracted position. The partial chain outline 33 of the parking roller 9, which appears immediately above and slightly to the rear of the operative position of the parking roller, shows the position attained by parking roller 9 at the point where it has been propelled down into contact with the road and the jack-ramp 25, but before the rear wheel has been lifted off the ground by the interaction of jack-roller 24 and ramp 25.

As the normal attitude of the assembly comprising arm 1 and parking roller 9 is dictated by the relaxed positions of the rubber bushes 5 and 10, it will be seen that the height at which the parking roller 9 and jack-roller 24 approach the ground and the jack-ramp 25 may vary according to the degree of loading of the car, since they are secured to the sprung portion of the car whose height will, of course, vary with load. For this reason, it is necessary that the upper part of jack-ramp 25 shall have an upward extension reaching a height above that at which the jack-roller makes contact with it when the bottom surface of parking roller 9 is in contact with the road, since under conditions of light load or no load the parking roller 9 may be, say an inch and a half clear of the road when it reaches the fore and aft plane of the jack-ramp.

This upward extension 34 of jack-ramp 25 may be more steeply inclined to the horizontal than the working part of the ramp, and may be of lighter construction since its only duty is to intercept jack-roller 24 and push it downwards until the tread 35 of roller 9 makes contact with the road.

Other parts shown in FIGURE 1 and FIGURE 3 are the rear axle tube 36, the rear road spring 37, the plates 38 and 39 whereby the road spring 37 is secured to the axle, the forward spring-eye 40 and the side walls 41 which embrace it, and which also form a convenient mounting point for the forward portion of flexible rubber bush 10.

The channel section 42 forms part of the structure of the car, and is used in this case as a support for the side plates 7 securing flexible bush 5.

In this instance, it is convenient to mount the arm 1 inboard of the road spring, but in many cases the correct geometry will more conveniently be obtained by mounting the arm on the outboard side of the road spring. Such an arrangement is shown in FIGURES 4 and 5.

In FIGURES 4 and 5 the device is shown fitted to another popular type of car, wherein the axle tube 43 has bolted to it by means of U-bolts 44 and spring plate 45, road spring 46, which is also shown in section in FIGURE 5. The forward spring-eye of road spring 36 is supported by pressing 47 secured to box member 48 below the floor panel 49 of the car chassis.

A pressing 50 is located and secured at its forward end by two bolts 51, whose main purpose is to secure pressing 47 to box member 48. Towards its rearward end, pressing 50 is also secured to car floor 49 by means of a plate 51 carrying studs 52 and nuts 53. Interposed between floor 49 and pressing 50 is a sheet rubber packing whose purpose is to distribute the load from pressing 50 evenly over the thin section of floor 49, and also to prevent the entry into the car body of exhaust fumes through holes for studs 52, or through a tooling hole, not shown, which is located in this area.

A T-piece 54 is secured to pressing 50 through the medium of rubber bushes 55, which may be bonded to the horizontal arms of T-piece 54. The outer surface of rubber bushes 55 are supported on their upper periphery by die castings 56 and clamped thereto by U-shaped pressings 57, which are in turn secured by studs 52 and nuts 53 above. It is arranged that on tightening nuts 53 the rubber of bushes 55 is placed under compression to a sufficient degree to provide an adequate torsional grip between the rubber bushes 55 and die castings 56 and clamps 57.

T-piece 54 has what on a true T would be its vertical arm set over somewhat to the left as viewed in FIGURE 5, and this arm of the T is bored for flanged bushes 58 and 59. These bushes carry cylindrical portions of the arm 60 and the upper bearing and journal may be smaller in diameter than the lower for a suitable distribution of the bending stresses which occur in these parts.

A short reduced portion above the upper journal 61 of arm 60 has flats formed on it and enters in a suitable non-circular hole in retaining plate 62, which is secured by washer 63 and set screw 64. A collar 65 is formed on arm 60 below the lower bush 58 and bears on the flange thereof.

Although arm 60 may be fabricated in any convenient way, it is in this case manufactured from a forging 66 welded to a tube 67 whose other end is welded to a second forging 68, which forms the mounting for parking roller 69, as earlier described.

Forging 68 carries an upward extension on the top of which is formed a boss 70, which is bored for jack-roller pivot-pin 71 which supports jack-roller 72.

In the construction shown in FIGURE 4, the proportions of roller 69 are somewhat modified from those shown earlier, so that the elastic tread 73 is bonded to the pressing 74 in such a way that the driving ring 75, which may be an aluminum die casting, may be secured to pressing 74 at a later stage, as by rivets 76. Also the flanged bushes 78, in which the spindle 77 of parking roller 69 is carried, may be made in this case of a material such as nylon filled with a lubricant, for example, molybdenum disulphide.

The upper end of the assembly and the means of securing the roller in its bearings, may be as described in FIGURE 1, but the outer periphery of the lower flanged bush 78 may be so formed that when assembled a lip 80 may bear against the face 81 of the roller spindle 77. This lip will act as a seal against the ingress of dirt, and an additional ring type of seal 82 which may have a tension spring ring of a known type may be fitted over the outer diameter of the lower circular portion of forging 68.

At an intermediate point along tube 67 may be welded a lug 83 carrying a taper bore wherein is fitted ball 85 to receive ram 86, shown only in FIGURE 5. The chain outline 87 shows the retracted or inoperative position of the assembly.

It will be seen from FIGURE 5 that the pivot of arm 60 is located outboard of road spring 46, and it is necessary for the upper part 66 of arm 60 to pass under spring 46 when the unit is withdrawn to its retracted position.

As the part of forging 66 which passes under road spring 46 when the equipment is retracted, must have adequate clearance from the road on its under surface, and must also clear the road spring with its upper surface when the spring relaxes on rebound, this part of forging 66 is flattened in such a way that its thinnest section lies horizontally when retracted. It may have fitted to its upper surface a rubber buffer to prevent noise during extreme rebound movements of the spring, but this is not shown in FIGURE 4, since on the car illustrated there is a rubber spring clip which serves the same purpose.

Lug 83, in addition to being provided with the tapered hole for ball 85, is provided with a hole 88 to which may be shackled the retraction spring cable in a similar manner to that shown in FIGURES 1 and 2. For reasons of clarity, this spring cable has not been shown in FIGURES 4 and 5.

The equipment shown in FIGURES 4 and 5 operates as follows:

During normal driving there will be no pressure in the oil pipe connected to the cylinder of a ram in which the ram part 86 reciprocates and to the opposite ram serving the other wheel, so the retraction spring will maintain the two parking units in their inoperative position as indicated by chain lines 87 through the action of the two spring cables attached thereto. This retraction spring assembly is not shown in FIGURES 4 and 5.

When the driver desires to drive the rear of his car sideways for parking or a similar manoeuvre, he places it in low or reverse gear according to whether he wishes to drive to the left or to the right, and then pulls a control knob. This cuts off the free circulation of oil in the pump and control valve, and directs the full output of the pump into the pipe line and thence into the rams. The rams are then caused to extend, pushing the two balls 85 apart, and drawing out cable from the retraction spring assembly, thus deflecting the spring. The outward thrust of ball 85 causes arm 60 to swing downwards and rearwards on bearings 58 and 59. During this movement as the arms rotate about the axis of bearings 58 and 59, the weight of arm 60, ram 86 and roller 69 will be supported by the torsional stiffness of rubber bushes 55.

Under normally loaded conditions, the ground-engaging roller 69 will touch the road at about the same time as jack-roller 72 makes contact with jack-ramp or cam 89, which is secured to lower spring plate 45.

Under conditions of light load as mentioned above, the jack-roller may come in contact with the upper extension of jack-ramp 89 before the tread 73 of roller 69 touches the road. In either case the inter-action of jack-roller 72 and jack ramp-89 will cause the whole assembly to be deflected downwards about the horizontal axis of T-piece 54.

This downward rotation of arm 60 will stress rubber bushes 55 in torsion, but since in this case the rams act horizontally and there is no upward resultant on the car chassis, the torsional resistance of bushes 55 need be no greater than that necessary to sustain the weight of the assembly during the first part of the operation as described above.

Further extension of the ram part 86 will cause the ground engaging roller 69 to roll outwards along the road towards tyre 90, and at the same time jack-roller 72 acting on jack-ramp 89 will lift the axle and wheel until tyre 90 is clear of the road.

Finally, the flank 75 of ground engaging roller 69 will press into the corner of tyre 90 to a sufficient extent to secure a reliable drive. If the driver now releases his clutch, or in the case of a car with automatic transmission simply opens the throttle, the rear of the car will be driven to left or right as described above.

It will be seen that the road springs and dampers are free to operate during this sideways movement if required to do so by road irregularities which will be transmitted directly through roller 69 and jack-roller 72 to axle 43. Relative movement can then take place between the axle of the car chassis by deflection of road spring 46, but at the same time there will be further deflection of bushes 55 as the parking unit follows this movement.

The horizontal axis of T-piece 54 is located as nearly as possible to the virtual centre of the rear springing system, in order that there may be little or no sliding movement between jack-roller 72 and jack-ramp 89 during such springing movements. When the sideways driving manoeuvre has been completed, the driver will push the control knob to the off position, thus destroying the pressure in the system and permitting the output of the pump to circulate as before.

As soon as the ram thrust is thus removed, the ground-engaging rollers 69 will be pushed inwards, in the first place by the recovery thrust of tyre 90 as it reassumes its normal attitude, and then by the weight of the car acting through jack-ramp 89 on jack roller 72.

Additional to these forces will be the pull of the retraction spring, not shown, through its cables.

It is important that powerful forces should act towards initial retraction of the roller 69, as at this stage the danger exists that road irregularities might tend to hold the roller in or near the operating position, causing delay if the driver wishes to move his car. As soon as the parking roller 69 has moved inward sufficiently for the tyre 90 again to take the weight of the car, the resistance to further sideways retractive movement of parking roller 69 will be greatly reduced, since its tread 73 will no longer be in heavy contact with the road. It will then be carried forward and upward to its fully retracted position by the action of the retraction spring and cable, not shown.

The jack-ramp 89 should be arranged to present a suitable inclined plane to jack-roller 72 such that the roller 69 will unfailingly be forced inwards during the early stage of the retraction operation, even if serious road irregularities are encountered.

Angle between 20° and 25° has been found suitable for this purpose but this angle may be reduced by curving the lower extremity of jack-ramp 89 since the initial retractive movement is assisted by tyre recovery thrust. This reduction in the slope of jack-ramp 89 may be helpful by reducing vertical sliding movement between tyre 90 and driving ring 75 of parking roller 69 at the stage when these are in close frictional contact.

The jack-ramp 89 may be attached to the spring plate 45 or to any other convenient part adjacent to the wheel hub in any of a number of ways. For example, it might be bolted to spring plate 45, employing the same U-bolts and nuts as attach the former part to the axle and spring assembly. Alternatively, upward extensions from the ramp may pick up the studs and nuts which secure the brake back plate to the rear axle. In this case it is constructed generally in the form of a T-piece having a vertical member 91, whose upper edge is welded to the forward edge of spring plate 45, and which is folded rearward around the remote forward corner of spring plate 45, so as to form a stiffener against fore and aft deflection of the jack-ramp.

The fore and aft panel 92 so formed is welded to the remote face of spring plate 45 as viewed in FIGURE 4.

FIGURES 6 and 7 show an alternative method of attaining the two degrees of freedom required by the arm 60 in a construction of the general type shown in FIGURES 4 and 5.

In FIGURES 6 and 7 the arm 93 which carries the ground engaging roller has journals formed upon it above collar 94 in a similar manner to those in FIGURES 4 and 5. These journals however are borne in a specially shaped block 95, which may be of nylon or similar material. This block 95 in turn is surrounded by a rubber moulding 96 which is retained in compression between two pressings 97 and 98. The rubber moulding is so formed that the block 95 is restrained against all but very small movements in the plane normal to that of FIGURE 6 which is approximately the fore and aft plane of the car, but so as to permit appreciable angular rotation about the axis 99 of the two bosses 100 formed on the upper part of block 95.

Movement in the latter plane will be against a substantially torsional resistance caused mainly by deflecting the enlarged portions 101 and 125 of rubber moulding 96. These can be proportioned to provide the correct degree of torsional resistance required. It should be noted that for convenience, the journals of arm 93 in FIGURE 6 are shown as if viewed normally, whereas in fact they are inclined somewhat as shown in FIGURE 7. Similarly, FIGURE 8 is shown as a true circular section through the tapered portion of arm 93, whereas it is in fact a slightly elliptical section.

The construction shown in FIGURES 6, 7 and 8 may be a convenient one to adopt where the pivoted end of arm 93 of the parking unit may most conveniently be located near a vertical face or panel on the car chassis.

FIGURE 9 is a sectional view through the type or ram preferred for use with this invention.

FIGURE 10 is an endwise view of the same, sectioned through the ball joint at the righthand end of FIGURE 9.

Figure 18:
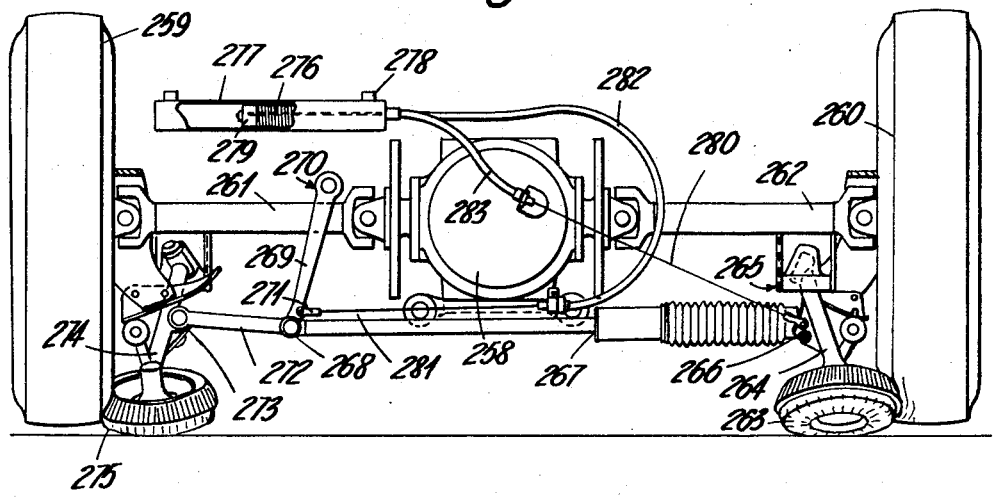

The tubular piston 102 is attached by means of a taper and nut 103 to C-piece 104 only part of which is shown in FIGURE 9.

Oil is fed through a hose and union, not shown, into tapping 105, and thence by drilling 106 to a groove and cross drilling communicating with the hole 107 in hollow piston 102. A similar drilling 108 communicates with the opposite ram on the side of C-piece 104, which is not shown.

Piston 102 fits in the bore of ram cap 109 which is screwed into cylinder 110. Slidably arranged inside cylinder 110 is working piston 111, the reduced portion 112 of which is carried in minor bore 113 of cylinder 110. At the remote end of working piston 112 there is arranged a spherical bearing seat 114, which bears against a ball 115 which in turn is retained by plunger 116, spring 117 and screwed cap 118, which may have a hexagonal socket for purposes of tightening or disassembly.

A rubber bellows 119 protects the ball joint and the exposed sliding part of working piston 112 from the weather. It also serves to retain lubricant. The hollow piston 102, which is of sufficient diameter only to overcome the resistance of the retraction spring of the parking device, is arranged by means of a mechanical interlock to be locked in its fully extended position, as drawn, by plungers 120 which are retained by keep ring 121. As soon as piston 102 reaches its fully extended position and is locked there, the inward movement of plungers 120 frees working piston 112 which can then extend.

Similarly, during the retraction cycle the face 122 of piston 112 pushes away keep ring 121 compressing keep ring spring 123 and permits outward movement of plungers 120 into recess 124, thus locking working piston 112 in its turn, and freeing piston 102 to enable retraction to be completed.

FIGURE 11 is a plan view of the complete parking unit of which the nearside unit only is shown in FIGURES 4 and 5.

Rear axle 126 carries wheels and tyres 127 and 128, road springs 129 and 130, associated with which are spring plates 131 and 132. Secured to the pinion shaft of the rear axle by means of universal joint 133 is propeller shaft 134. On the nearside, that is to say the righthand side of FIGURE 11 the arm 135 is carried at its forward end by bushed T-piece 136 which has bonded to it rubber bushes 137 and 138. These bushes are attached to the car frame by parts not shown, as described in FIGURES 4 and 5, or in any other convenient way.

At the other end of arm 135 is mounted parking roller 139 and jack-roller 140, which in this view is concealed by jack-ramp 141 attached to spring plate 131. Ball joint 142 attaches hydraulic ram 143 to arm 135. The other end of ram 143 is secured to C-piece 144, which in turn is secured to opposite ram 145 in a manner described above and is slung from an unsprung part of the chassis frame.

On the offside of FIGURE 11 arm 146 and parking roller 147 are similarly arranged, except that since parking roller 147 must be located somewhat behind the axle in this view and tilted oppositely to parking roller 139 to secure an efficient sideways drive, the arm 146 is located somewhat further to the rear, and its supporting T-piece 148 is located more rearwardly and somewhat further outboard than T-piece 146 on the nearside.

Ram 145 is attached to arm 146 by ball joint 149 at such a point that the thrust along the axes of hydraulic rams 143 and 145 results in substantially equal forces being applied by driving rings 150 and 151 of parking rollers 139 and 147 respectively to their respective tyres.

Wire cables 152 and 153 are attached at suitable points to arms 135 and 146, and are connected to piston 154 which is located at the remote end of traction spring 155 carried in tube 156. The cable 152 in this instance is arranged to have a substantially straight line pull along an axis approximately parallel to that of spring 155 and tube 156, whereas cable 153 must be turned through about 120° from this axis, so as to pull along a suitable line in relation to the pivot 148 of arm 146.

The anchorages 157 and 158 of cables 152 and 153 are located at suitable points along arms 135 and 146 respectively, so that the spring force has approximately equal resultants at that part of the thread of parking rollers 139 and 147, which are in contact with the ground, since it is at this location that the greatest resistance to the retractive effort of the spring arises. The centres of these areas of contact, which are not visible in FIGURE 11 are approximately indicated by points 159 and 160.

The lefthand end of spring casing tube 156 is closed except for a breather hole 161 by a cap 162, shown partly cut away, and connected to a supporting flange 163, only partly shown, which may be bolted to the floor of the car. At the other end of tube 156 is a housing 164 for cable pulley 165. Housing 164, which may be a die-casting, incorporates a socket 166 which fits over tube 156, suitable attachment lugs, not shown, for supporting it from the car roof, or as conveniently, a drilling through which passes cable 152 and which communicates with the shroud 167 surrounding pulley 165. An outlet 168 passes cable 153 off pulley 165 in the appropriate direction.

The mouths through which cables 152 and 153 emerge may be flared or may have flared bushes or inserts of material resistant to friction and wear. Cables 152 and 153 may also be fitted with outer cables or rubber or similar protective tubes or bellows in a known manner, and they may also be guided by additional pulleys or guideways as may be convenient or required by the layout of the car.

For example, it may be necessary in some cases to pass the cable 152 over propellor shaft 134 along a curved path close to the floor of the car in order to avoid contact between the cable and the propellor shaft 134 at extreme bump movements. The piston 154 is formed with a shoulder against which abuts the end of spring 155, and a reduced portion fitting inside the spring.

The piston 154 may be drilled centrally to pass cables 152 and 153 and these may be secured at the lefthand end of piston 154 in any convenient manner. For example, cables 152 and 153 may be formed of one length of cable turned back on itself around a suitable restraint associated with piston 154. This restraint may be suitably formed grooved washer and set-screw, or piston 154 may have formed in it a conical bore 169 into which fits a conical plug 170, having grooves formed to enable cable 152–153 to pass around it in a loop approximately in a diametral plane.

These grooves are of sufficient depth to locate the cable, but are shallower than the minimum compressed thickness of the cable, so that when plug 170 is forced into conical bore 169 of piston 154 by spring tension, or for example by screw means or both, conical bore 169 will jam cables 152 and 153 in grooves of plug 170, so as to prevent relative movement. A screw, not shown, may also be employed to facilitate freeing plug 170 in piston 154, or a single screw 171 may combine these functions when turned in different directions.

C-piece 144 is shown in this instance passing beneath universal joint 133, and it is restrained against rotation about the axis of rams 143 and 145 by extensible link 172, the upper end of which may be secured to the car floor. Link 172 may be in the form of an extensible spring press and may be joined to C-piece 144 and to the car floor at each end by any convenient means, such as pin joints, ball joints or rubber bushes.

When pressure is released in rams 143 and 145, either by pushing the control knob to the off position or by stopping the engine, spring 155 will start to close the working pistons 173 and 174 of rams 143 and 145. As soon as these working pistons are fully closed the small pistons 175 and 176 will close and the parking assemblies will be drawn up into their retracted position, as shown in chain-line at 177 and 178. C-piece 144 will then swing to a new position, shown at 179, and in this case will lie some distance below propeller shaft 134. If there is a possibility that on extreme rebound C-piece 144 might be touched by the rotating propeller shaft 134, this can be prevented by arranging a light link, not shown, between axle nose 180 and any convenient point in front of the retracted position of C-piece 144 where its forward end may be connected to the floor of the car by a short vertical link.

This longitudinal link, not shown, may carry a horizontal disc which can be caused to intercept a conical rubber abutment at a convenient point on C-piece 144 so as to carry the C-piece downwards before it can touch propeller shaft 134. Such contact would be undesirable owing to the high speed rotation of propeller shaft 134.

If this longitudinal link is to be kept to a reasonable length, its downward movement with rebound of axle nose 180 will be less than the corresponding downward movement of the rear part of the propeller shaft 134, as the latter is anchored further forward. For this reason, the disc attached to the longitudinal link should be arranged to make contact with C-piece 144 at a smaller radius to the axis of rams 143 and 145 than the throat of C-piece 144, which would otherwise touch propeller shaft 134.

C-piece 144 may alternatively be arranged beneath the axle but lying to the rear of the axis of rams 143 and 145, in which case on extreme rebound it may make cushioned contact with the axle, as described in the earlier part of this specification.

In many cases it will be convenient for C-piece 144 to pass above axle nose 180, and it may then be located by a link to the car floor which lies approximately horizontally.

When the equipment is in its operating position, the C-piece may be allowed to approach closely to the top of axle nose 180, since there is no relative movement between these parts. In the retracted position on the other hand, it will be lifted to a position well clear of axle nose 180 and universal joint 133, as there is usually ample clearance between axle nose 180 and the car floor.

If the anchorage points of cables 152 and 153 are chosen to give the best distribution of the spring force on each side, it may be found that the lengths of cable extension required are longer on one side than another. Such a case is shown in FIGURE 11 where the distance between the mouth 168, from which cable 153 is drawn off, and the anchorage point 158 in its operational and retracted positions respectively, is greater than the corresponding length of the near side. This difficulty can be met by arranging a small extensible member 181 between cable 153 and anchorage 158. This extensible member 181 may be in the form of a tubular spring press, whose spring rate is so arranged that is gradually extended during the downward movement of the parking units.

To ensure that neither of the rollers 139 or 147 are pushed unduly far into their respective tyres, which might result in the opposite tyre giving a weak drive to the opposite roller, the outward movement of arm 135 is limited by lug 182 formed as an upward extension of jack-roller boss 183 abutting against a forward extension 184 of the lower extremity of jack-ramp 141. A similar arrangement is made on the offside assembly, but this is obscured in FIGURE 11 by spring plate 132. This upwardly extending lug and the corresponding projection on the spring plate are more clearly seen as references 185 and 186 on FIGURES 4 and 5.

The C-piece 144 of FIGURE 11 has drillings connecting the hollow pistons 175 and 176 to a union and hose 187. This hose is connected to a pipeline, pump and control valve on the engine of the car, not shown. The control valve is connected to a suitable control knob on the facia of the car.

FIGURE 12 shows the rear wheels and suspension members of a front-wheel-drive type of car. Wheels and tyres 188 and 189 are mounted on longitudinally disposed suspension arms 190 and 191, which are themselves pivoted about transverse axis 192 and controlled by springs and damping arrangements, not shown.

Sideways parking means for front-wheel-drive cars of this type and for semitrailer lorries, may consist of a pair of cylindrical rollers which in their operating position cause the rear wheels to be lifted slightly from the ground, but not to engage with the tyres, which on such cars are not, of course, driven by the engine. Two rollers of this type are shown in FIGURE 12 at 193 and 194 and they are so arranged that their axes of rotation if produced forwardly, would meet at a point outside the line joining the centres of the two near side tyres, and somewhat forward of the line joining the two front wheel centres.

These rollers 193 and 194 may be carried on ball bearings or similar antifriction bearings on spindles which are supported in bosses 195 and 196 on the ends of arms 197 and 198. These arms are themselves pivoted on components 199 and 200, Which may be generally similar to the T-pieces shown in FIGURES 4, 5 and 11. These T-pieces may be mounted in rubber bushes and secured to the floor of the car by brackets 201, 202, 203 and 204, or the arms may be secured by any other arrangement as described which permits them to pivot freely along one axis, but to have elastically restrained pivots along another axis.

The axes of the rubber bushes or similar torsionally sprung support for pivots 199 and 200 should be located as nearly as possible in line with the axis 192 about which the rear suspension oscillates. A single ram assembly 205 may be attached at each of its ends by ball joints 206 and 207 to arms 197 and 198. It is here shown in the extended position.

Oil under pressure may be supplied to ram 205 by hose 208 connecting with pipeline, control valve, and oil pump, as mentioned above. The assembly is normally retained in its retracted position by the tension in cables 209 and 210, which pass around pulleys 211 and 212 and connect with helical retraction spring 213, which is supported in casing 214 and arranged substantially as described in FIGURE 11, though in this case the spring casing is arranged along the fore and aft axis of the car for convenience.

On oil pressure being applied to ram 205 the arms 197 and 198 will carry rollers 193 and 194 from their retracted position, shown in chain-line at 215 and 216 to a point where the jack-rollers 217 and 218 engage with jack-ramps 219 and 220, which are attached to convenient locations on wheel hubs 221, and 222, or suspension arms 190 and 191. The interaction of the jack-ramps and jack-rollers then cause wheels 188 and 189 to be lifted clear of the road and the outward movement of each parking unit may be limited as described above. In some cases there may be insufficient clearance under the car floor to accommodate rollers 193 and 194 in a position sufficiently clear of the road if the upward extensions of arms 197 and 198 are rigidly fixed to these arms.

One convenient solution to this problem is to have these upward extensions pivoted to the rearward extremities of arms 197 and 198 and urged towards their upper positions by spring means. Such an arrangement is shown in FIGURE 13, where the arm 223 carries a pivot 224 whereon is mounted extension strut 225 carrying jack-roller 226. A spring 227 urges the strut and jack-roller towards their upper position, and they are retained in this position when they engage the jack-ramp 228, because the line joining the pivot of jack-roller 226 and pivot 224 is arranged so that pressure from jack-ramp 228 urges strut 225 to rotate in an anticlockwise direction as drawn, i.e., in a direction opposite to that which would compress spring 227 and lower the jack-roller and its strut into its lower position.

Any clockwise rotation of strut 225 beyond its normal upper position is prevented by abutment 229 bearing on part of arm 223. On retraction, when the rear extremity of arm 223 rises to a point where it would foul the floor of the car, it is engaged by a suitable trackway 230, which can be so curved at its outer end as to cause strut 225 to collapse downwards, the spring 227 being arranged to be considerably weaker than the retraction spring as 213 in FIGURE 12.

The path of trackway 230 against which jack-roller 226 rests when in the fully retracted position, may be made of soft or elastic material to eliminate noise, or may be so positioned as to hold strut 225 locked in its lowest position. Arms 197 and 198 may also be restrained in their fully retracted position by being drawn into rubber faced crutches 231. The purposes of these crutches is to prevent vertical oscillation of the assemblies about their elastic pivots under the influence of road irregularities. Similar rubber faced crutches may be applied at suitable points in the assembly shown in FIGURE 11.

Referring to FIGURES 14, 15 and 16 this method is particularly suitable for cars having modern types of suspension wherein in order to improve handling qualities the effective centre of oscillation of the rear wheel mounting on its springs lies forward of the rear wheels, and at about half the height of the wheel axis from the ground. To suit such suspensions the transverse pivot 232 must be mounted as low as possible consistent with adequate road clearance, otherwise at different degrees of deflection of the road spring 233 there will be excessive fore and aft displacement between jack-roller 234, and jack-ramp 235.

The transverse pivot 232 consists of a hardened tube 236 held between side plates 237 and 238 by bolt 239. These side plates are attached by means of an existing chassis bolt 240 and one other bolt 241 to chassis member 242. A steel strip 243 is suitably formed and attached to side plates 237 and 238, so as to make an abutment for rubber block 244, which is generally L-shaped, as viewed in side elevation. Rubber block 244 forms a resilient spring location for carrier 245 which corresponds, in principle, to the T-piece shown in earlier figures. Carrier 245 has formed on one side suitable supports for pivot pin 246. On its other side, carrier 245 has a radial extension 247, whose face engages with rubber block 244. Rubber block 244 is also engaged by the radial face 248, which forms part of support for pivot pin 246. Pivot pin 246 lies at an oblique angle normal to the path swept by ground-engaging roller 249 between its operating position, as drawn, and its retracted position clear of the road. The path of roller 249 is of course modified towards its outward and downward end by interaction of jack-roller 234 and jack-ramp 235, causing angular movement about transverse pivot 232 and deflection of rubber block 244.

Arm 250 carries at its upper end flanged bearing bushes 251 and 252, and suitable seals as 253, which are supported by pivot pin 246 and inner faces of carrier 245. Arm 250 carries a mounting for ball-joint 254 for attachment of operating ram assembly, not shown, and also a hole 255 to which may be attached a retraction spring cable. An alternative method of constructing arm 250 is shown in FIGURE 17, which is a section on the line AA through the mounting for ball-joint 254. Here the pressing 256 is folded back on itself, so as to form a circular or other conveniently shaped beam, and a double flange 257, the two parts of which are joined by resistance welding. This flange may run the full length of the pressing, tapering at each end to the minimum width suitable for welding, and increasing in width at the centre as shown in FIGURE 17 to form part of the support for ball-joint 254. A block 258 is welded to this central portion and a taper-reamed hole is formed through the full depth of flanges and block.

Figure 19:
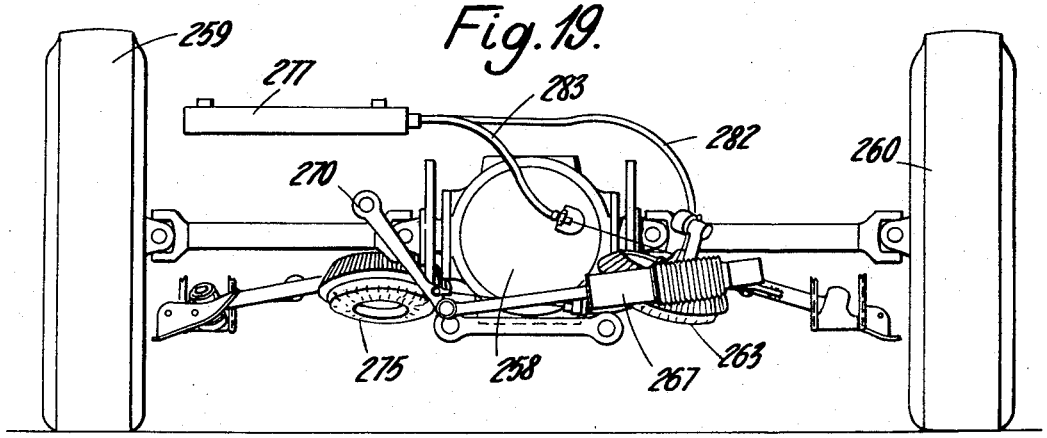

FIGURES 18 and 19 show a further alternative form of the invention particularly suitable to vehicles having independent rear suspensions, where the space occupied by the suspension components is such as to make it desirable to mount one parking unit in front of the rear suspension and one to its rear.

FIGURE 18 shows such an arrangement of the parking apparatus in its operating position as viewed from the rear of the vehicle. A final drive housing 258 transmits drive to wheels 259 and 260 by means of universally jointed shafts 261 and 262. Other suspension details such as links and springs have been omitted in this figure for the sake of clarity.

The right hand parking roller 263 is located towards the rear of the wheel centre lines and the arm 264 supporting it extends towards the viewer to its mounting 265 on the sprung portion of the vehicle, not shown. Arm 264 carries the ball joint 266 to which is attached one end of ram mechanism 267. This ram mechanism has approximately twice the stroke of each of the rams described earlier, so that it can provide sufficient movement to carry both of the parking rollers from their retracted position to their operating position. The left hand end of ram assembly 267 is attached by ball-joint 268 to the rearward lever 269 of an offset bell-crank whose shaft 270 extends away from the viewer through the rear suspension to a similar forward lever 271, which extends downwardly parallel to lever 269, so that it is not separately visible in this figure. A ball-joint at the lower end of lever 271 connects it to a link 272, which is connected by a similar ball-joint 273 to arm 274, supporting left hand parking roller 275, which are located at the front of the axes of the rear wheels.

A helical retraction spring 276 is supported in the casing 277 attached to a convenient part of the vehicle. Its right hand end 278 is restrained against movement. The left hand end of spring 276 bears against piston 279 to which are secured the ends of inner cables 280 and 281. Cables 280 and 281 pass inside the spring and enter outer cables 282 and 283, which have fixed abutment at each of their ends in a known manner, so that the direction of pull of inner cables 280 and 281 may be arranged as convenient. The further ends of cables 280 and 281 are attached respectively to the right hand arm 264 and to a point on rearward lever 269, so that extensive movement of spring 276 results in substantially equal degrees of retractive movement of the right hand and left hand parking units.

FIGURE 19 shows the apparatus described above in the retracted position.

I claim:

1. Parking apparatus for a motor vehicle having a sprung part and an unsprung part connected by resilient means, comprising:
    (a) ground-engaging rollers mounted on opposite sides of the vehicle adjacent the vehicle road wheels and movable from a retracted position beneath the vehicle to a position wherein they engage the ground and cause the vehicle wheels to be lifted from the ground,
    (b) power mechanism for imparting up and down movement to the ground-engaging rollers,
    (c) a transmission for rotating the rollers when the vehicle wheels are lifted from the ground,
    (d) mountings in which the respective rollers are rotatably supported in such an attitude that when the rollers are rotated they move the vehicle sideways,
    (e) at least the greater part of the assemblage comprising said rollers, their mountings and the power mechanism being carried on the sprung part of the vehicle, and
    (f) a member secured to the mounting of each ground-engaging roller and engaging in compression the unsprung part of the vehicle towards the downward limit of movement of the rollers in such manner as to impart an upward thrust to the unsprung part of the vehicle and to place said member in compression and raise the unsprung part of the vehicle relative to the sprung part, whereby the vehicle wheels are lifted clear of the ground while the ground-engaging rollers engage the ground and can be rotated by said transmission.

2. Parking apparatus for a motor vehicle having a sprung part and an unsprung part connected by resilient means, comprising:
    (a) a pair of ground-engaging rollers mounted on opposite sides of the vehicle adjacent a pair of the vehicle road wheels,
    (b) a pair of arms, each arm having one of said rollers at one of its ends, (c) pivotal connections between the other ends of said arms and a sprung part of the vehicle, permitting said arms to swing up and down so as to move said ground-engaging rollers between a retracted position beneath the vehicle and an operative position in which they engage the ground, (d) power mechanism for imparting such swinging movement to the arms, (e) mountings for said rollers on said arms, such that rotation of said rollers when in engagement with the ground causes the adjacent end of the vehicle to move sideways, (f) at least the greater part of the assemblage comprising said rollers, their mountings and arms and the power mechanism being carried on the sprung part of the vehicle, (g) cooperating cam and cam follower means disposed at each side of the vehicle, one on the respective arm adjacent its roller and the other on an unsprung part of the vehicle, said cam and cam follower being movable against each other with a wedge action to impart an upward thrust to the unsprung part of the vehicle towards the downward limit of movement of the rollers and to raise the unsprung part of the vehicle relative to the sprung part, whereby the said pair of vehicle wheels are lifted clear of the ground as the ground-engaging rollers reach their operative position, and (h) means to rotate the ground-engaging rollers when the said pair of vehicle wheels have been lifted clear of the ground.

3. Parking apparatus for a motor vehicle, comprising:

(a) a pair of ground-engaging rollers mounted on opposite sides of the vehicle adjacent a pair of the vehicle road wheels and movable from a retracted position beneath the vehicle to an operative position in which they engage the ground and cause the said pair of vehicle road wheels to be lifted from the ground, (b) a pair of arms, each arm having one of said rollers at one of its ends, (c) pivotal connections between the other ends of said arms and the sprung part of the vehicle, each said pivotal connection having two pivot axes inclined to one another and directed so as to permit (i) pivotal movement of the respective arm relative to the sprung part of the vehicle about an axis inclined to the vertical as the arm swings the ground-engaging roller from the retracted position downwards and outwards to the operative position, (ii) pivotal movement of the arm relative to the sprung part of the vehicle about a substantially horizontal axis approximately transverse of the vehicle, as the road wheel is lifted from the ground and as the vehicle road springs are deflected, (d) power mechanism for imparting such swinging movement to the arms, (e) mountings for said rollers on said arms, such that rotation of said rollers when in the said operative position causes the adjacent end of the vehicle to move sideways, (f) at least the greater part of the assemblage comprising said rollers, their mountings and arms and the power mechanism being carried on the sprung part of the vehicle, (g) elements carried upon the mountings of the respective ground-engaging rollers and adapted to engage the unsprung part of the vehicle associated with said pair of road wheels towards the downward limit of movement of the rollers in such manner as to impart an upward thrust to the said unsprung part, whereby the said pair of road wheels are lifted clear of the ground as the ground-engaging rollers reach their operative position, and (h) means to rotate the ground-engaging rollers when the said pair of road wheels have been lifted clear of the ground.

4. Parking apparatus according to claim 3 further comprising a single retraction spring assemblage and retraction spring cables each of said cables having one end secured to one of said mountings for the rollers and its other end secured to a part associated with the moving end of the retraction spring assemblage, in such a manner that movement of the said retraction spring imparts a substantially equal degree of movement to each ground-engaging roller.

5. Parking apparatus for a motor vehicle, comprising (a) a pair of ground-engaging rollers mounted on opposite sides of the vehicle adjacent a pair of the vehicle road wheels, (b) a pair of arms, each arm having one of said rollers at one of its ends, (c) pivotal connections between the other ends of said arms and the sprung part of the vehicle, permitting said arms to swing obliquely up and down so as to move said ground-engaging rollers between a retracted position beneath the vehicle and an operative position in which they engage the ground, (d) power mechanism for imparting such swinging movement to the arms, (e) mountings for said rollers on said arms, such that rotation of said rollers when in the operative position causes the adjacent end of the vehicle to move sideways, (f) at least the greater part of the assemblage comprising said rollers, their mountings and arms and the power mechanism being carried on the sprung part of the vehicle, (g) cooperating cam tracks and cam followers disposed at each side of the vehicle, each cam track being mounted on the unsprung part of the vehicle and each cam follower being mounted on a respective one of said arms adjacent its ground-engaging roller, said cam followers being adapted to engage said cam tracks towards the downward limit of movement of the rollers and thereby to impart an upward thrust to the unsprung part of the vehicle, whereby the said pair of road wheels is lifted clear of the ground as the ground-engaging rollers reach their operative position, and (h) means to rotate the ground-engaging rollers when the said pair of road wheels has been lifted clear of the ground.

6. Parking apparatus according to claim 5 wherein means are provided for effecting resilient restraint to the pivotal movement of the arm about the substantially horizontal transverse axis for the purpose of maintaining the ground-engaging roller in the desired line of movement during its descent from the said retracted position to a position where it is in contact with the road, whilst at the same time permitting the ground engaging roller, when in its operating position, to follow up and down movements of the unsprung parts of the vehicle relative to the sprung parts, caused by deflection of the road springs.

7. A parking apparatus according to claim 5 wherein each said cam track is fixed to a mounting plate for a vehicle wheel spring.

8. Parking apparatus according to claim 5 wherein each cam follower comprises a roller the peripheral face of which is section in a plane containing the axis of the roller is convexly curved.

9. Parking apparatus according to claim 5 wherein stop means are provided on the arms for limiting the outward swing of said arms for the purpose described.

10. Parking apparatus according to claim 5 wherein said power mechanism is a fluid-actuated ram mechanism, opposite ends of said ram mechanism being articulately connected to said arms whereby said arms are the sole support for said ram mechanism.

11. Parking apparatus according to claim 10 wherein said articular connections between the ends of the ram mechanism and the arms are universal joints.

12. Parking apparatus according to claim 10 wherein said fluid actuated ram mechanism is single acting and is arranged to impart downward movement to the ground-engaging rollers against the action of spring means which is adapted to impart return upward movement to the rollers.

13. Parking apparatus according to claim 10 wherein the ram mechanism comprises two rams in series having their adjacent ends connected to a thrust sustaining member and their other ends articulately connected to the two arms which carry the ground engaging rollers.

14. Parking apparatus according to claim 13 wherein said thrust sustaining member is shaped so as to straddle the drive transmission elements of the vehicle.

15. Parking apparatus according to claim 13 wherein said thrust sustaining member is slung from a sprung part of the vehicle by resilient means so as to prevent rotation of that member about the axis of the rams.

16. Parking apparatus according to claim 5 wherein one of said ground-engaging rollers and its arm are located in front of, and the other to the rear of, the rear suspension assemblage of the vehicle, and wherein said power mechanism is a single hydraulic ram device, the apparatus further comprising a first universal joint connecting one of said arms to one end of said ram device, movement-transmitting means connected to the other end of said ram device, and a second universal joint connecting said movement-transmitting means to the other of said arms.

References Cited

UNITED STATES PATENTS

| | | | |
|---|---|---|---|
| 1,884,932 | 10/1932 | Walker | 180—1 |
| 3,202,231 | 8/1965 | Butterworth | 180—1 |

A. HARRY LEVY, *Primary Examiner.*